Patented Dec. 30, 1930

1,787,064

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

METHOD FOR RETARDING THE DETERIORATION OF RUBBER

No Drawing.   Application filed August 30, 1929.   Serial No. 389,607.

This invention relates to a method of treating rubber and the resulting rubber product and is more particularly concerned with a method of treatment whereby a rubber product is obtained which is unusually resistant to deterioration.

It is generally accepted that the rate of deterioration of rubber articles differs greatly depending on various factors, such as the composition of the stock, the form of the article, and the conditions under which it is used. Various materials have heretofore been incorporated in rubber stocks to inhibit deterioration.

The primary object of this invention, therefore, is to provide a method for retarding the deterioration of rubber by the use of a new class of compounds, which not only may be easily and economically prepared from readily available materials, but which at the same time do not retard the cure.

With these objects in view it has now been discovered that diamino- and substituted diamino-diaryl-hydrols may be added to a rubber mix without materially affecting the rate of cure and that the resulting rubber product when vulcanized has much greater resistance to deterioration than rubber containing no age-resisting compounds.

The compounds contemplated by the invention have the following formula:

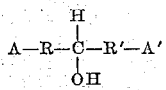

wherein A and A' represent an amino group, or a mono- or dialkyl amino group and R and R' represent aryl nuclei which may or may not contain alkyl or alkoxy substituents. The manner of preparing compounds of the type indicated by the general formula is fully described in the prior literature.

In order to disclose the invention in detail, the following example of an actual embodiment thereof is presented. It should be understood, however, that this example is furnished purely for purposes of illustration and that it is not the intention that the invention be limited to the particular reagents, proportions, or other conditions therein specified.

*Example 1: Tetra-methyl-diamino-benzhydrol*

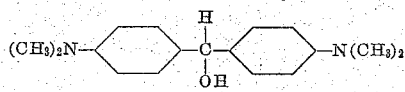

Two stocks were made up of the following composition; the proportions are given by weight:

|  | A | B |
|---|---|---|
| Rubber | 100 | 100 |
| ZnO | 18.15 | 18.15 |
| Sulfur | 2.75 | 2.75 |
| D. O. T. G. | 0.5625 | 0.5625 |
| Antioxidant | 0.0 | 1.0 |

The stocks were cured for 40 minutes at 40 lbs. steam pressure and aged in the oxygen bomb at 70° C., under 300 lbs. oxygen pressure. Stock A was completely deteriorated in 3 days, while stock B was not completely deteriorated at the end of the 11th day when the test was discontinued.

It will be obvious that many other amino compounds of the type indicated by the general formula may be employed in place of the compound of the example. Among such compounds may be mentioned for purposes of illustration the following which have anti-aging properties similar to those of tetra-methyl-diamino-benzhydrol.

(1) 4:4'-diamino-benzhydrol

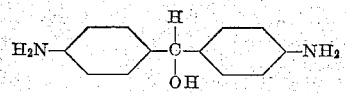

(2) 3:3'-diamino-benzhydrol

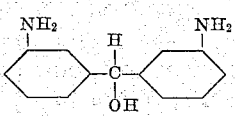

(3) 3:4'-diamino-benzhydrol

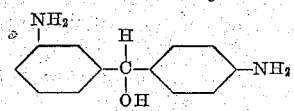

(4) 4:4'-diamino-3:3'-dimethyl-benzhydrol

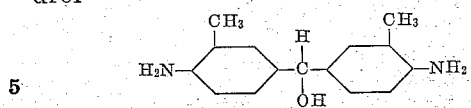

(5) 4-amino-4'-dimethyl-amino-benzhydrol

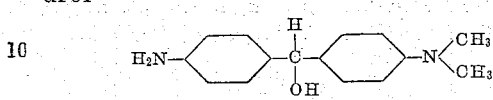

(6) 3:3'-dimethyl-amino-benzhydrol

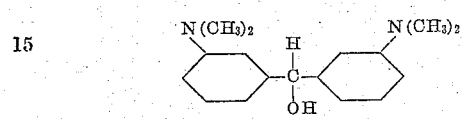

(7) 3:4'-dimethyl-amino-benzhydrol

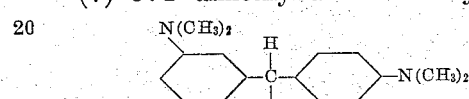

(8) 4:4'-methylamino-3:3'-dimethyl-benzhydrol

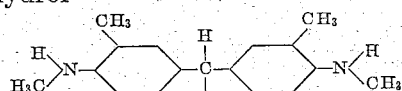

(9) 4:4'-dimethylamino-2:2'-dimethyl-benzhydrol

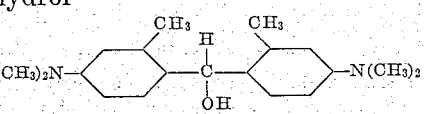

(10) 4:4'-dimethylamino-3:3'-dimethyl-benzhydrol

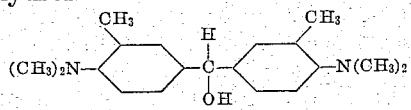

(11) 4-dimethylamino-4'-diethylamino-benzhydrol

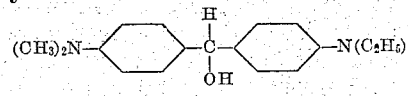

In addition to the above listed compounds the reaction products of p-p'-diamino-benzhydrol and benzyl chloride, ethylene chlorhydrin or ethylene dichloride have anti-aging properties similar to those of the products listed.

Many other compounds falling within the general class described herein could be named. Thus, the corresponding dinaphthyl and phenylnaphthyl compounds are embraced within the scope of the invention. Of all these compounds, however, by reason of their unusual effectiveness and their economy of preparation, the tetra-methyl-diamino compounds are preferred and of this latter class tetra-methyl-diamino-benzhydrol represents the preferred embodiment.

It will be obvious from the above description that the aryl groups may contain substituents such as alkyl and hydroxy substituents without materially altering the value of the compounds, as age inhibitors.

The antioxidants described above may be incorporated into the rubber by any well known means, such as by milling them into the stock upon the rolls of an ordinary mill. Moreover, they can be employed in various rubber compounds and rubber substitutes, such as, for example, gutta percha, balata, and synthetic rubber, and it is therefore to be understood that the invention is not limited to any particular rubber stock or rubber compound.

Also, the proportion of the antioxidant employed may be varied within wide limits depending upon the stock treated and the conditions to be met in use. Under ordinary circumstances, however, from 1 to about 5% of the antioxidant based on the weight of the rubber has been found to be highly satisfactory.

While we prefer to use the antioxidants of this type by adding the antioxidant to the rubber mix prior to vulcanization, it is also possible to use them for the treatment of vulcanized rubber. In such cases the rubber may be impregnated by either dissolving the antioxidant in a solvent, or by employing it in vapor form.

As many apparent and widely different embodiments of this invention may be made without departing from the spirit and scope thereof, it is to be understood that we do not limit ourselves to the specific embodiments thereof except as defined in the appended claims.

We claim:

1. The process of increasing the resistance of rubber to deterioration which comprises incorporating with the rubber a product having the following general formula

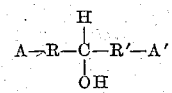

wherein A and A' represent amino groups or mono- or dialkyl amino groups, and R and R' represent aryl nuclei.

2. The process of increasing the resistance of rubber to deterioration which comprises incorporating with the rubber tetra-methyl-diamino-benzhydrol.

3. In the art of vulcanizing rubber, the step of mixing with the unvulcanized rubber a vulcanizing agent and a compound having the general formula

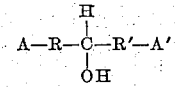

wherein A and A' represent amino groups or mono- or dialkyl amino groups, and R and R' represent aryl nuclei, and thereafter vulcanizing.

4. In the art of vulcanizing rubber, the step of mixing with the unvulcanized rubber a vulcanizing agent and a compound having the formula set forth in claim 1, in which formula at least one of A and A' represents an alkyl substituted amino group, and thereafter vulcanizing.

5. In the art of vulcanizing rubber, the step of mixing with the unvulcanized rubber a vulcanizing agent and a compound having the formula set forth in claim 1, in which formula at least one of A and A' represents a dialkyl substituted amino group, and thereafter vulcanizing.

6. In the art of vulcanizing rubber, the step of mixing with the unvulcanized rubber a vulcanizing agent and a compound having the formula set forth in claim 1, in which formula both A and A' represent an alkyl substituted amino group, and thereafter vulcanizing.

7. In the art of vulcanizing rubber, the step of mixing with the unvulcanized rubber a vulcanizing agent and a compound having the formula set forth in claim 1, in which formula both A and A' represent a dialkyl substituted amino group, and thereafter vulcanizing.

8. In the art of vulcanizing rubber, the step of mixing with the unvulcanized rubber a vulcanizing agent and a compound having the formula set forth in claim 1, in which formula both R and R' represent phenyl radicals, and thereafter vulcanizing.

9. In the art of vulcanizing rubber, the step of mixing with the unvulcanized rubber a vulcanizing agent and a compound having the formula set forth in claim 1, in which formula both A and A' represent alkyl substituted amino groups, and both R and R' represent phenyl groups, and thereafter vulcanizing.

10. In the art of vulcanizing rubber, the step of mixing with the unvulcanized rubber a vulcanizing agent and tetra-methyl-diamino-benzhydrol, and thereafter vulcanizing.

11. Rubber having incorporated therewith an anti-aging compound having the general formula

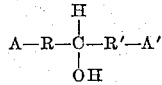

wherein A and A' represent amino groups or mono- or dialkyl amino groups, and R and R' represent aryl nuclei.

12. Rubber having incorporated therewith tetra-methyl-diamino-benzhydrol.

13. Vulcanized rubber obtained by incorporating therewith a vulcanizing agent and an anti-aging compound having the general formula

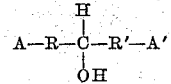

wherein both A and A' represent an alykl substituted amino group, and R and R' represent aryl radicals, and thereafter vulcanizing.

14. Vulcanized rubber obtained by incorporating therewith a vulcanizing agent and an anti-aging compound having the general formula

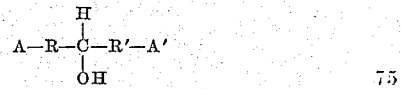

wherein both A and A' represent a dialkyl substituted amino group, and R and R' represent phenyl radicals, and thereafter vulcanizing.

15. Vulcanized rubber obtained by incorporating with the rubber prior to vulcanization from 1 to 5% of tetra-methyl-diamino-benzhydrol and a vulcanizing agent, and thereafter vulcanizing.

16. In the art of vulcanizing rubber, the step of mixing with the unvulcanized rubber a vulcanizing agent and 4-4'-diamino-benzhydrol, and thereafter vulcanizing.

17. In the art of vulcanizing rubber, the step of mixing with the unvulcanized rubber a vulcanizing agent and 4-4'-methyl-amino-3:3'-dimethyl-benzhydrol.

18. Vulcanized rubber obtained by incorporating with the rubber prior to vulcanizing from 1 to 5% of 4-4'-diamino-benzhydrol.

19. Vulcanized rubber obtained by incorporating with the rubber prior to vulcanizing from 1 to 5% of 4-4'-methyl-amino-3:3'-dimethyl-benzhydrol.

In testimony whereof we affix our signatures.

WILLIAM S. CALCOTT.
WILLIAM A. DOUGLASS.